US009520007B2

United States Patent
Stippich

(10) Patent No.: US 9,520,007 B2
(45) Date of Patent: Dec. 13, 2016

(54) REMOTELY OPERABLE LOCKOUT SYSTEM

(71) Applicant: James C. Stippich, Kewaskum, WI (US)

(72) Inventor: James C. Stippich, Kewaskum, WI (US)

( * ) Notice: Subject to any disclaimer, the term of this patent is extended or adjusted under 35 U.S.C. 154(b) by 2 days.

(21) Appl. No.: 14/269,988

(22) Filed: May 5, 2014

(65) Prior Publication Data

US 2015/0317856 A1     Nov. 5, 2015

(51) Int. Cl.
  *G07C 9/00* (2006.01)
  *F16P 3/08* (2006.01)
  *H01H 27/00* (2006.01)

(52) U.S. Cl.
  CPC . *G07C 9/00* (2013.01); *F16P 3/08* (2013.01); *G07C 9/00714* (2013.01); *G07C 9/00896* (2013.01); *G07C 9/00944* (2013.01); *H01H 27/00* (2013.01); *G07C 9/00309* (2013.01); *G07C 2009/00793* (2013.01); *Y10T 29/49004* (2015.01)

(58) Field of Classification Search
  CPC ... G07C 9/00896; G07C 9/00; G07C 9/00714; G07C 9/00944; G07C 9/00309; G07C 2009/09793; B41J 3/50; B41J 7/52; B60R 25/066; B60R 25/096; F16P 3/08; H01H 27/00; Y10T 29/49004
  See application file for complete search history.

(56) References Cited

U.S. PATENT DOCUMENTS

| | | |
|---|---|---|
| 5,349,144 A | 9/1994 | Baragar |
| 5,483,032 A | 1/1996 | Trayer et al. |
| 5,593,196 A | 1/1997 | Baum et al. |
| 5,742,220 A | 4/1998 | Scherer |
| 5,773,777 A | 6/1998 | Scherer |
| 7,133,271 B2 | 11/2006 | Jonas et al. |
| 7,334,443 B2 * | 2/2008 | Meekma ............ E05B 47/0673 307/10.2 |
| 7,984,665 B1 | 7/2011 | Robertson |
| 8,272,121 B2 | 9/2012 | Beck et al. |
| 8,342,494 B2 | 1/2013 | Ricci et al. |
| 8,449,310 B2 | 5/2013 | Siebens |

(Continued)

FOREIGN PATENT DOCUMENTS

| | | |
|---|---|---|
| EP | 0389677 A3 | 3/1990 |
| EP | 0422503 A1 | 4/1991 |

(Continued)

*Primary Examiner* — Sonji Johnson
(74) *Attorney, Agent, or Firm* — Boyle Fredrickson, SC

(57) ABSTRACT

A lockout system that includes a lock portion and a key portion that removably cooperate with one another to allow selective interference with a throw lever associated with operation of an electrical panel. The lock portion and key portion each include a guide arrangement and an electrical interface that cooperate with one another. The guide arrangements cooperate with one another to align the electrical interfaces of the respective key and lock portions. The lock portion includes a movable lock arm that selectively interferes with motion of the throw lever. The position of the lock arm relative to the throw lever can be manipulated when the electrical interfaces of the key portion and the lock portion are engaged with one another. Preferably, the lock and key interface includes an RFID protocol associated with authorizing respective key portions to communicate with respective lock portions.

13 Claims, 14 Drawing Sheets

(56) References Cited

U.S. PATENT DOCUMENTS

| | | |
|---|---|---|
| 2011/0199204 A1 | 8/2011 | Dionis et al. |
| 2012/0007723 A1 | 1/2012 | Whitaker et al. |
| 2013/0212873 A1 | 8/2013 | Kowalyshen et al. |
| 2013/0255335 A1 | 10/2013 | Jonely |
| 2014/0028443 A1 | 1/2014 | Ebner |

FOREIGN PATENT DOCUMENTS

| | | |
|---|---|---|
| EP | 2256775 A2 | 1/2010 |
| WO | 2011003199 A1 | 1/2011 |
| WO | 2013126753 A1 | 8/2013 |
| WO | 2013191767 A2 | 12/2013 |

* cited by examiner

REMOTELY OPERABLE LOCKOUT SYSTEM

FIELD OF THE INVENTION

The present invention relates generally to electric BUS systems and more particularly, to a lockout system for preventing unauthorized movement of the lever associated with the conducting condition of the panel circuit(s).

BACKGROUND OF THE INVENTION

Electrical panels are fairly common in many applications and many environments. Such panels customarily provide one or more operable switch assemblies associated with electrically isolating a load from a power source such as utility power or the like without exposing the user to the electrical signals. In residential applications, such electrical panels are commonly referred to as a breaker or fuse panel configured to allow the user to interact with discrete circuit switch elements disposed between the source and the respective loads. In many industrial applications, such panels are commonly referred to as distribution or BUS panels which are utilized to isolate dedicated equipment from the generally higher threshold power circuits delivered thereto as associated with most residential applications. Many BUS panels are commonly provided with external input levers or buttons such that technicians can isolate respective loads or equipment from source power without otherwise opening or accessing the respective panel associated therewith.

Particularly applicable to industrial environments, where more than one person or shifts of personnel may be involved in service activities associated with a particular piece of equipment or machine, a lockout and/or lockout/tag-out system is utilized to prevent the premature establishment of the electrical connectivity between the load and the source prior to the pertinent personnel's affirmative acknowledgement that their respective servicing activities are complete such that the associated load is suitable for subsequent operation. Such lockout systems commonly include a lock mechanism that is positioned and configured to interfere with operation of the panel lever such that power cannot be communicated beyond the panel until the lever can be operated to "close" the respective circuit associated therewith. Such configurations reduce the potential of personal being exposed to inadvertently reactivated equipment and/or circuits. Unfortunately, some such systems include various drawbacks that can detract from compliance with established lockout/tag out processes.

One concern associated with the desired interaction with such systems is the accessibility of the electrical panel associated with the operable throw lever. In many environments, such panels are commonly positioned in locations wherein the panel and associated conduits do not unduly interfere with the production environment and are otherwise not readily accessible to unauthorized personnel. Such considerations commonly result in the respective panels being located at devoted positions such that the panel is somewhat protected from interaction with unauthorized employees and ancillary equipment or vehicles associated with the production environment.

Interaction with such elevated panels by authorized personnel commonly requires utilization of a hot stick, lift, or ladder to interact with the throw lever associated with the panel and subsequent placement of a mechanical lockout device to prevent inadvertent or premature reactivation of the de-energized circuits and/or equipment. More than one person desiring a lockout condition can result in multiple trips up and down a ladder or lift or multiple personnel being required to interact with the lockout associated with a respective panel. Further, maintaining a lockout condition for an extended period of time can result in personnel being required to repeatedly retrieve and place either a ladder or a lift to achieve the desired interaction with the lockout and throw lever so as to not unduly interfere with the production environment via extended positioning of a ladder or lift in close proximity to the respective electrical panel or service location.

Accordingly, there is a need for a lockout system that is more conveniently operable from locations beyond the reach of an arm of a technician. There is further need for a lockout system that can be conveniently operated from remote locations and that can alter a lockout condition in response to instructions from mote than one user or technician.

BRIEF DESCRIPTION OF THE INVENTION

The present invention discloses a remotely operable lockout system that resolves one or more of the shortcomings discussed above. One aspect of the invention discloses a lockout system that includes a lock portion and a key portion that removably cooperate with one another to allow selective interference with a throw lever of an electrical panel. The lock portion and key portion each include a guide arrangement and an electrical interface that removably cooperate with one another. The guide arrangements cooperate with one another to align the electrical interfaces of the respective key and lock portions. The lock portion includes a movable lock arm that selectively interferes with motion of the throw lever. The position of the lock arm relative to the throw lever can be manipulated when the electrical interfaces of the key portion and the lock portion are engaged with one another. Preferably, the lock and key electrical interfaces include an RFID protocol associated with authorizing respective key portions to communicate with respective lock portions. Such a lockout system accommodates user interaction with the lockout system such that discrete electrical panels can be locked out by remote but proximate personnel.

Another aspect of the invention that is usable with one or more of the above aspects discloses an electrical panel lockout system having an alignment arrangement and an RFID interface supported by a housing securable to an electrical panel. The alignment arrangement is configured to align a RFID key with the RFID interface. A lock arm is supported by the housing and is movable between a first position and a second position. When in the first position, the lock arm does not interfere with motion of a throw lever associated with a conducting condition of an electrical panel. When in the second position, the lock arm interferes with motion of the throw lever thereby preventing changes to the conducting state associated with the position of the throw lever. The lock arm is movable between the first position and the second position in response to association of a RFID key with the RFID interface.

Another aspect of the invention that is useable with one or more of the above aspects discloses an electrical panel system that includes an electrical panel configured to communicate power to a load. A lever is located outside the electrical panel and moveable between a first position associated with electrically isolating a load from a power source and a second position associated with electrically connecting the load to the power source. The system includes a lockout system that includes a first portion that is connected to the electrical panel and a second portion that removably cooperates with the first portion. The first portion of the lockout system includes a lock arm that is associated with the lever and is moveable between a first position wherein the lock arm interferes with motion of the lever and a second position wherein the lever is movable relative to the lock arm. The first portion of the lockout system includes a guide arrangement and an electrical lock interface. The second portion of the lockout system includes an electrical key interface and an alignment arrangement. The alignment arrangement is constructed to slidably cooperate with the guide arrangement associate with the first portion such that cooperation of the alignment arrangement with the guide arrangement aligns the electrical key interface with the electrical lock interface to allow slidable physical interaction between the electrical lock interface and the electrical key interface to accommodate selective remote manipulation of the lock arm relative to the lever of the electrical panel.

Another aspect of the invention that includes one or more aspects that are useable with one or more of the above aspects discloses a method of forming a remotely operable electrical lockout. The method includes mounting a lock portion of a lockout system to an electrical panel such that a movable lockout arm is positioned proximate a lever whose position relative to the panel is associated with a conducting state of a circuit associated with the electrical panel. The lock portion of the lockout system is provided with a first portion of an indexing arrangement and a first portion of an electronic interface. A removable key portion of the lockout system can be selectively associated with the lock portion and includes a second portion of the indexing arrangement and a second portion of the electronic interface such that the first and second portions of the indexing arrangement cooperate with one another prior to interaction between the first and second portions of the electronic interface to align the first and second electronic interfaces with one another such that the first and second portions of the electronic interface slidably cooperate with one another prior to dissociation of first and second portions of the indexing arrangement.

These and other aspects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
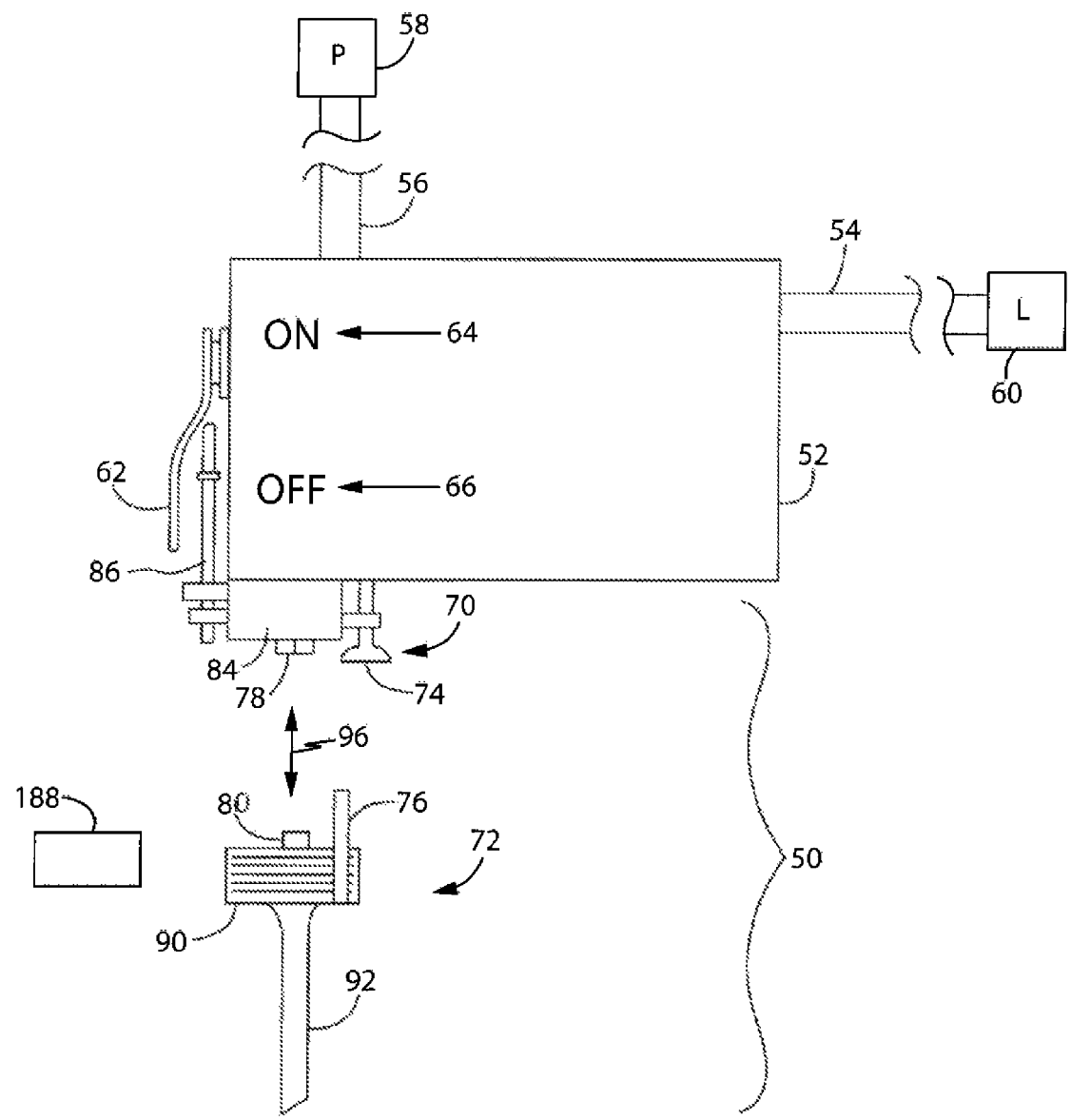
FIG. 1 is a front elevation view of an electrical panel equipped with a lockout system according to the present invention.

In describing the various embodiments of the invention, which is illustrated in the drawings, specific terminology will be referred to for the sake of clarity. However, it is not intended that the invention be limited to the specific toms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DETAILED DESCRIPTION OF THE PREFERRED EMBODIMENT

The present invention and the various features and advantageous details thereof are explained more fully with reference to the non-limiting embodiments described in detail in the following description.

FIG. 1 is an elevation view of a lockout system 50 according to the present invention associated with an exemplary electrical panel 52. One or more conduits 54, 56 are commonly connected to electrical panel 52 and carry conductors associated with communicating electrical signals from a power source 58 to a load 60. Electrical panel 52 commonly includes a circuit interrupter device associated with "making" or a closed electrical condition and "breaking" or an open electrical condition associated with electrical conductivity between power source 58 and load 60. A handle or throw lever 62 extends from panel 52 and is movable between a first or ON position 64 associated with the closed electrical condition and a second or OFF position 66 associated with electrically isolating load 60 from power source 58.

Lockout system 50 includes a first portion or lock portion 70 that is associated with panel 52 and a second portion or key portion 72 that removably cooperates with lock portion 70. Each of lock portion 70 and key portion 72 include an alignment, indexing or guide arrangement 74, 76 and an electronic or electrical interface 78, 80 that each respectively removably cooperate with one another to allow physical and electrical communication between lock portion 70 and key portion 72 to LOCK and UNLOCK the operability of throw lever 62 relative to electrical panel 52.

Lock portion 70 includes a housing 84 that is constructed to cooperate with electrical panel 52. Housing 84 is constructed to include an RFID reader 68 (FIG. 7) and supports guide arrangement 74 and a lock arm 86 associated with lock portion 70. As disclosed further below, lock arm 86 is movable relative to housing 84 between a first or unlocked position wherein lock arm 86 does not interfere with motion of throw lever 62 relative to electrical panel 52 and a second or locked position wherein lock arm 86 interferes with motion of throw lever 62 relative to panel 52 thereby preventing the undesired configuration of panel 52 to a conducting condition wherein electrical power is communicated to load 60.

Key portion 72 includes a housing 90 that is constructed to cooperate with an extension 92 and supports guide arrangement 76 relative thereto. Key portion 72 is constructed to include or removably cooperate with an authorization key, such as a radio frequency identification (RFID) card 188. As disclosed further below, key portion 72 removably cooperates with lock portion 70 during translation in an axial direction, indicated by arrow 96, to facilitate the desired movement and/or positioning of lock arm 86 relative to throw lever 62 to provide selective operation of throw lever 62 between the ON 64 and OFF 66 positions relative to panel 52.

Figure 2:
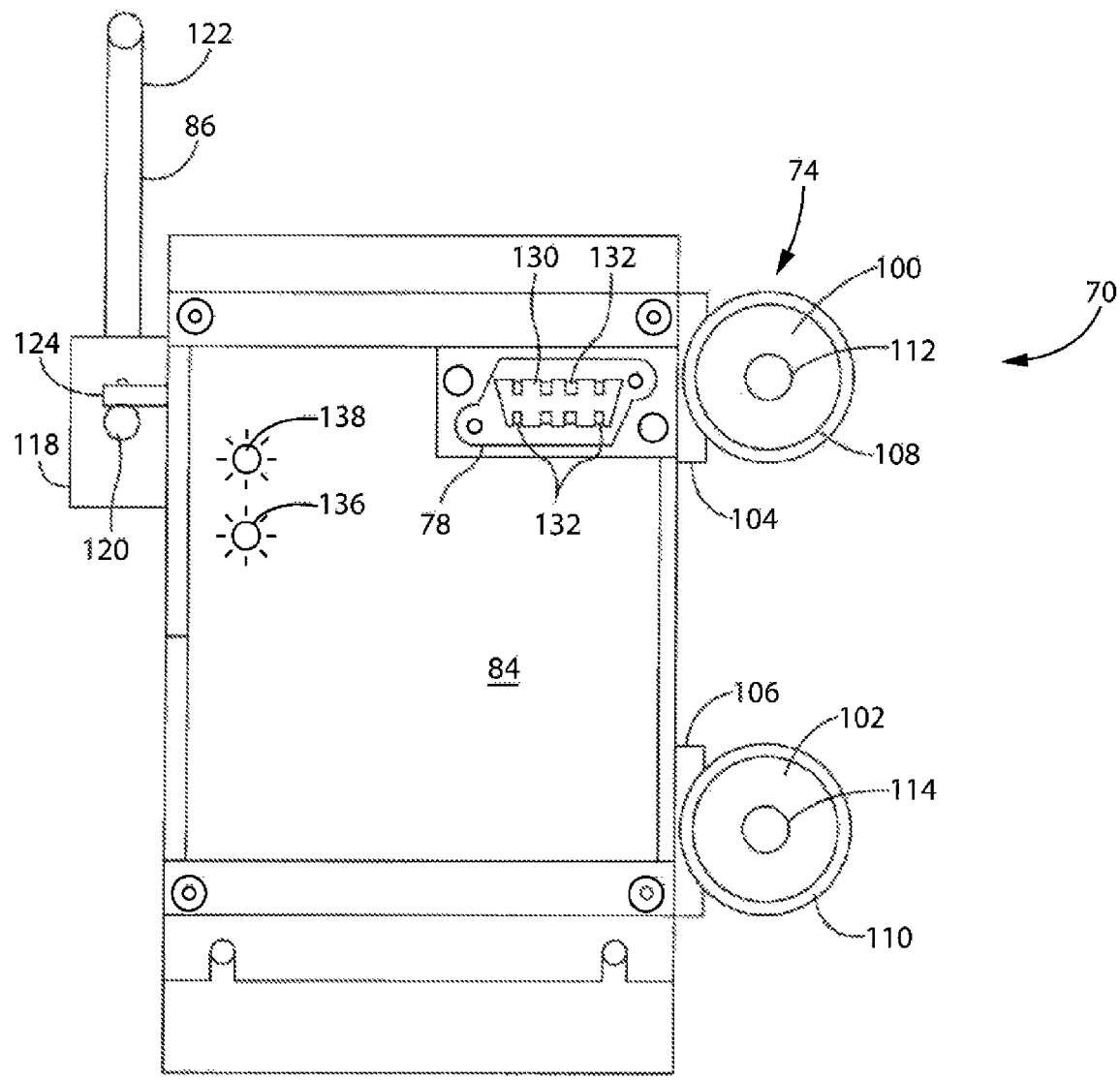
FIG. 2 is a bottom plan view of a lock portion of the lockout system shown in FIG. 1.
Figure 3:
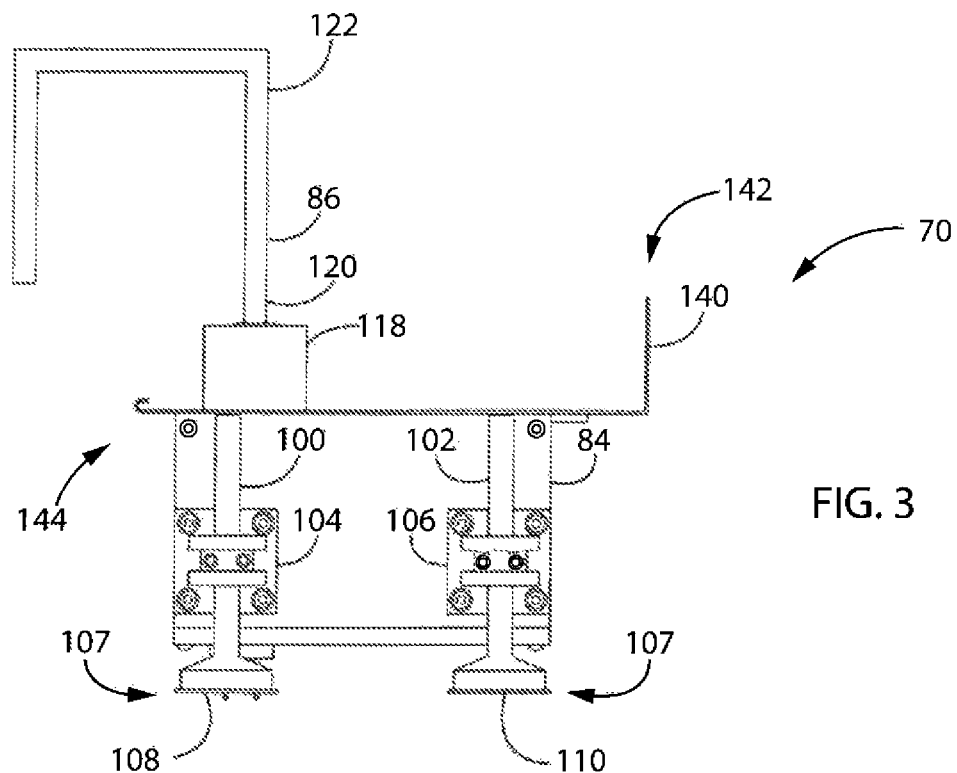
FIG. 3 is a right side elevation view of the lock portion shown in FIG. 2.
Figure 4:
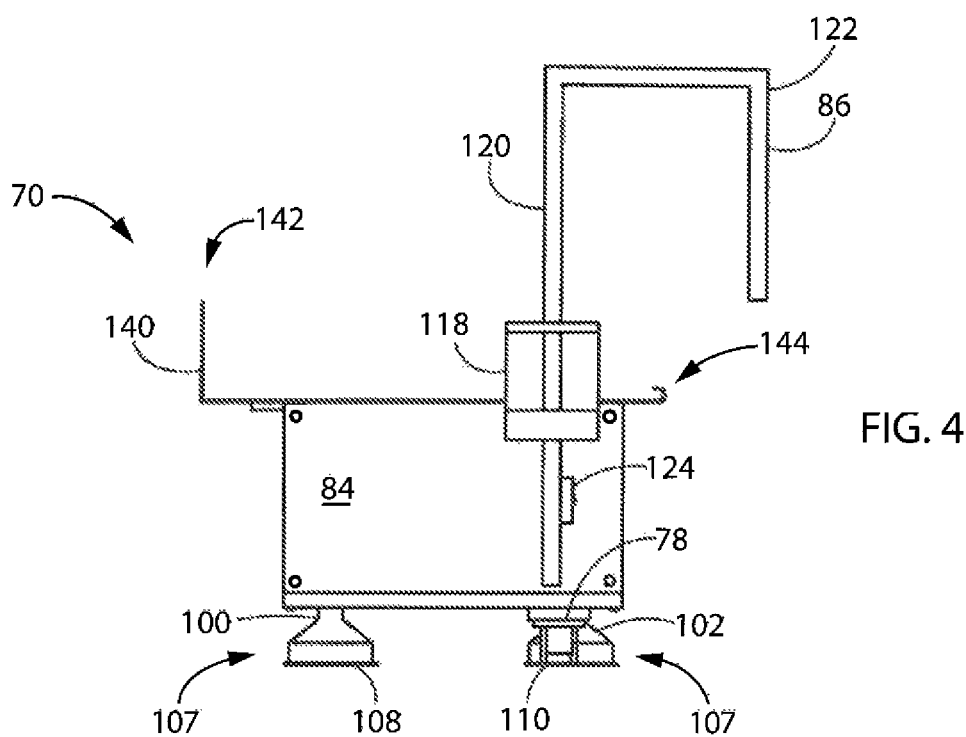
FIG. 4 is a left side elevation view of the lock portion shown in FIG. 2.

FIGS. 2-4 show various views of lock portion 70 of lockout system 50. Lock portion guide arrangement 74 includes a first guide member or guide tube 100 and a second guide member or guide tube 102 that are supported by housing 84. A first mount body 104 and a second mount body 106 are attached to housing 84 and support respective guide tubes 100, 102. As disclosed further below, a downward facing end 107 of each guide tube 100, 102 includes an enlarged opening 108, 110 that is shaped to direct guide arrangements 76 associated with key portion 72 toward a center passage 112, 114 associated with a respective guide tube 100, 102.

A bracket 118 extends from a generally opposite side of housing 84 relative to guide tubes 100, 102 and is constructed to support lock arm 86 relative thereto. Lock arm 86 includes a first portion 120 that rotationally cooperates with bracket 118 and a second or U-shaped portion 122 formed at a generally opposite end thereof. When secured to panel 52, U-shaped portion 122 of lock arm 86 is positioned to selectively interfere with translation of throw lever 62 relative to panel 52. As explained further below, a bracket 124 extends from housing 84 and is connected to first portion 120 of lock arm 86. Bracket 124 is selectively movable relative to housing 84 to effectuate rotation of lock arm 86 relative to throw lever 62 such that lock arm 86 can selectively interfere with motion of throw lever 62 relative to panel 52.

Electrical interface 78 of lock portion 70 includes a multi-pin connector 130 that includes a plurality of electrical pin connections 132 configured for removable connectivity with electrical interface 80 associated with key portion 72. Electrical interface 78 of lock portion 70 is external to housing 84 such that electrical interface 80 associated with key portion 72 can removably cooperate therewith to facilitate electrical communication between lock portion 70 and key portion 72.

Housing 84 can include one or more optional indicators 136, 138 associated with providing a visual indication as to the status of lock arm 86 relative to ON and OFF positions 64, 66 and/or the conducting condition associated with communication of an electrical signal to load 60. It is further appreciated that lock portion 70 can include one or more indicators associated with the LOCKED and/or UNLOCKED condition associated with lock arm 86 as disclosed further below. It is further appreciated that lock portion 70 may include no indicators such that visual inspection of lock arm 86 would provide an indication as to a LOCKED or UNLOCKED condition associated with the relative orientation of lock arm 86.

Referring to FIGS. 3 and 4, housing 84 includes a mounting bracket 140 associated with securing lock portion 70 relative to electrical panel 52. Opposite ends 142, 144 of bracket 140 are preferably constructed to allow mounting bracket 140 to be oriented relative to electrical panel 52 such that lock arm 86 is positioned proximate throw lever 62 such that lock arm 86 can selectively interfere with translation of throw lever 62 between ON and OFF positions 64, 66 relative to electrical panel 52.

Figure 5:
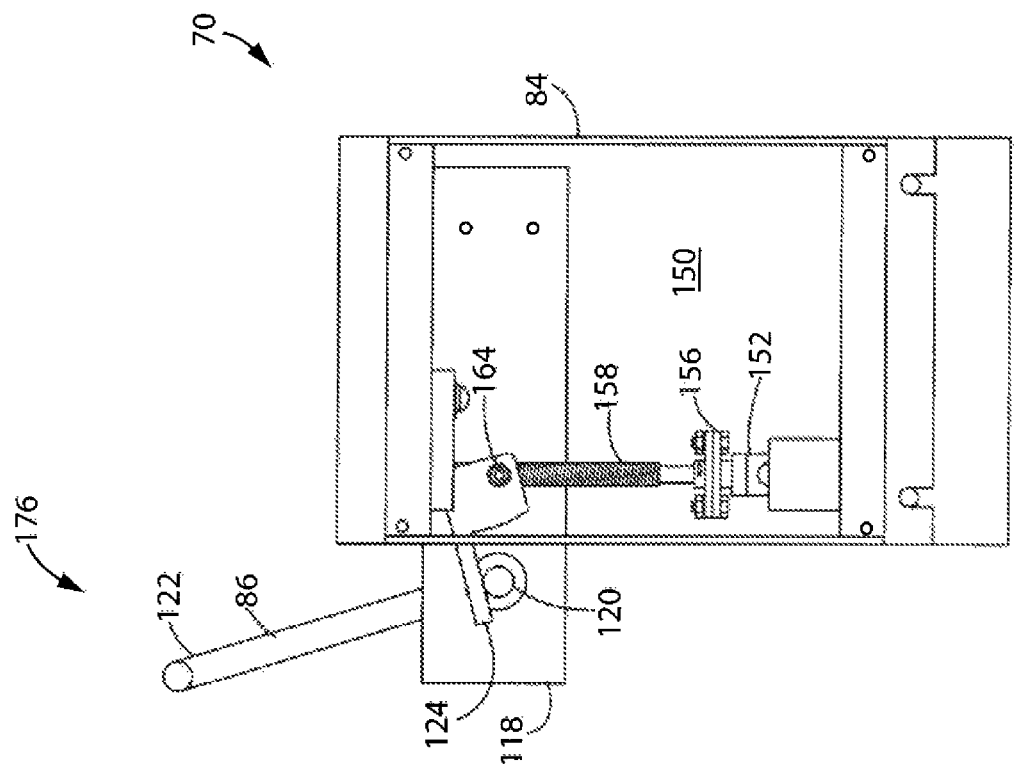
FIGS. 5-7 are various cross-section views of the lock portion of the lockout system shown in FIG. 2.
Figure 6:
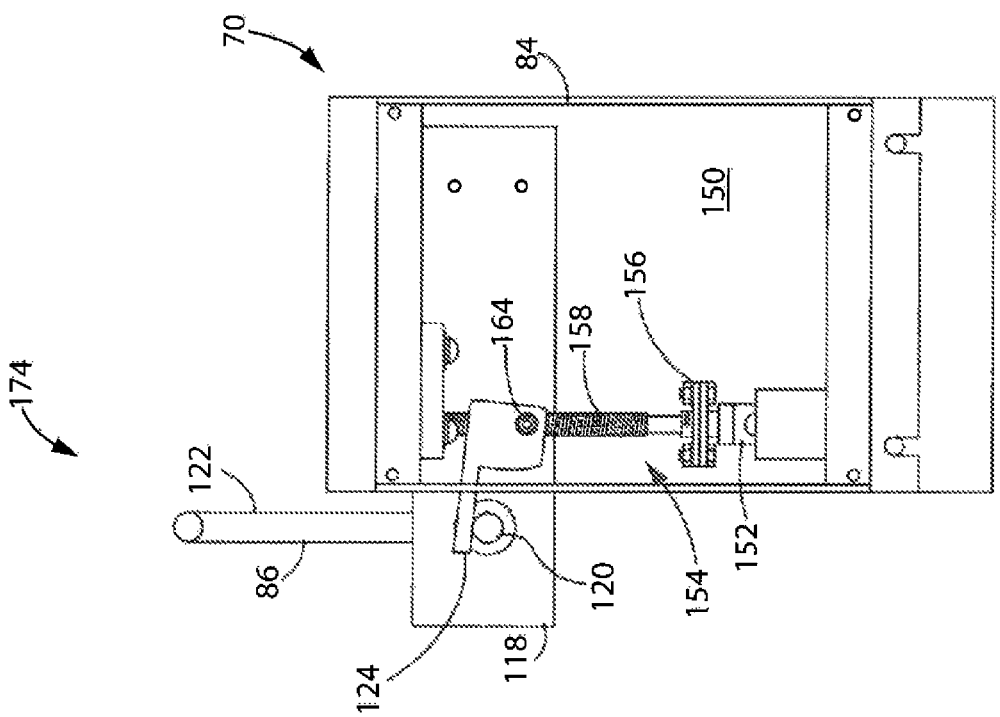
Figure 7:
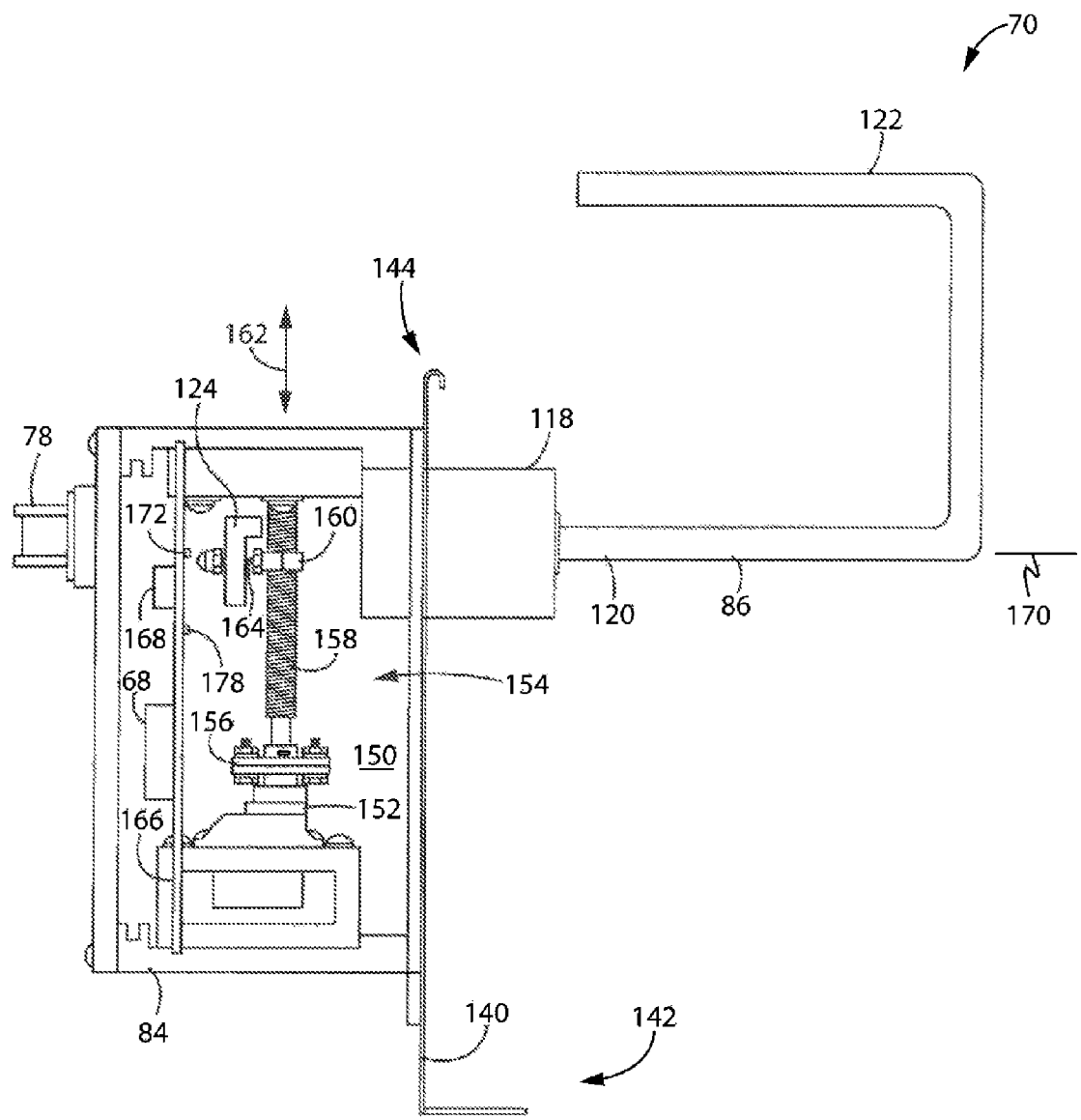
Figure 8:
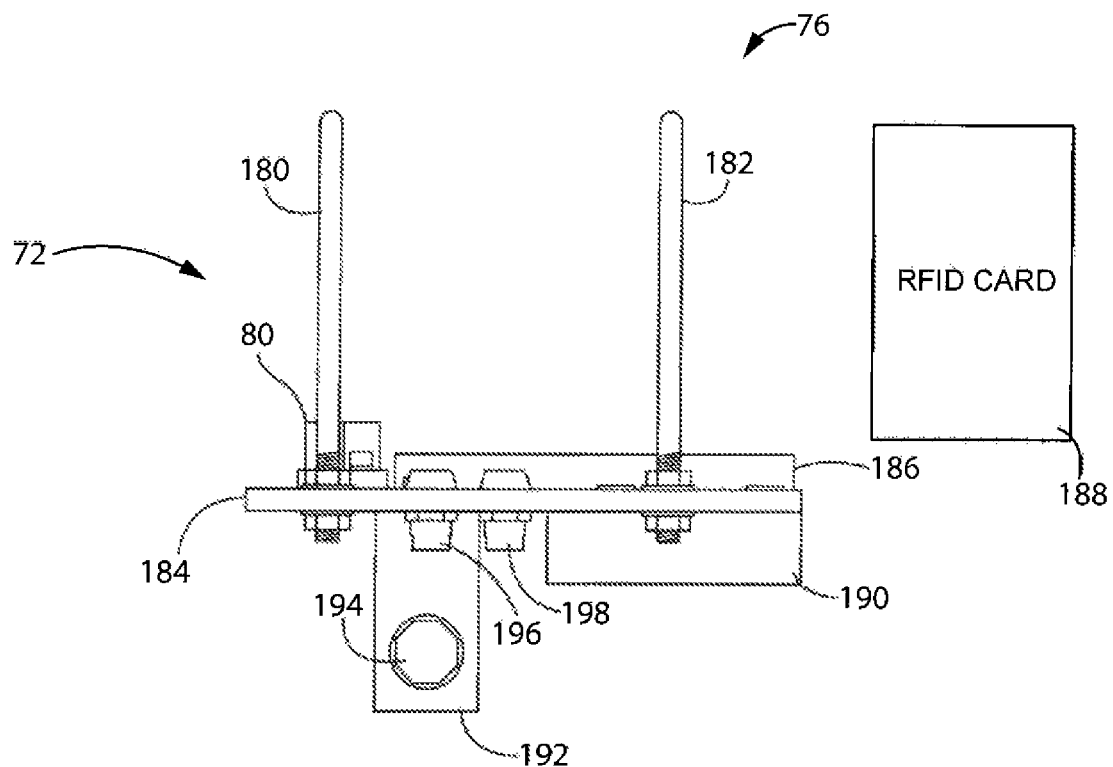
FIG. 8 is a right side elevation view of a key portion of the lockout system shown in FIG. 1.
Figure 9:
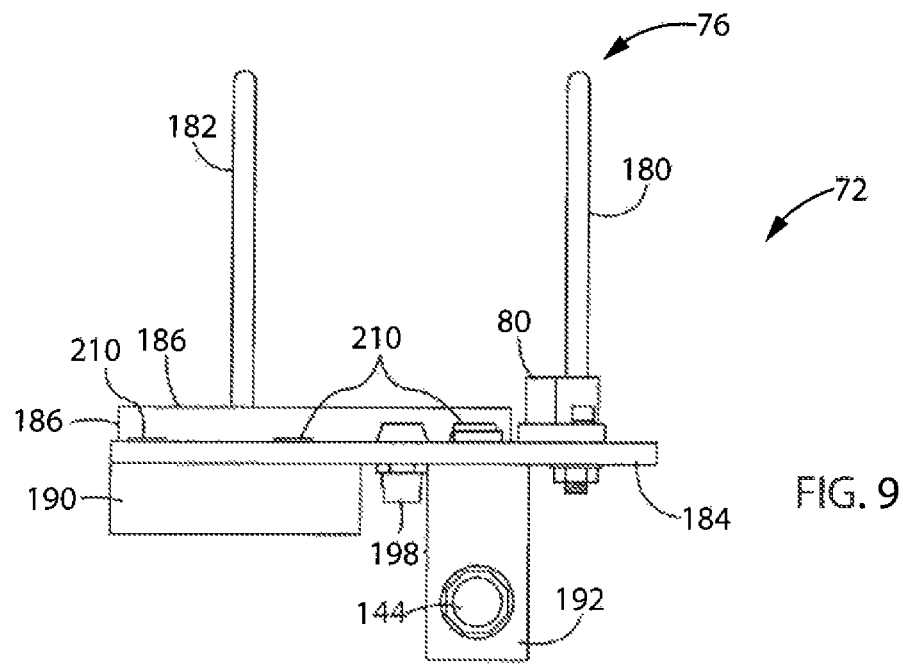
FIG. 9 is a left side elevation view of the key portion shown in FIG. 1.
Figure 10:
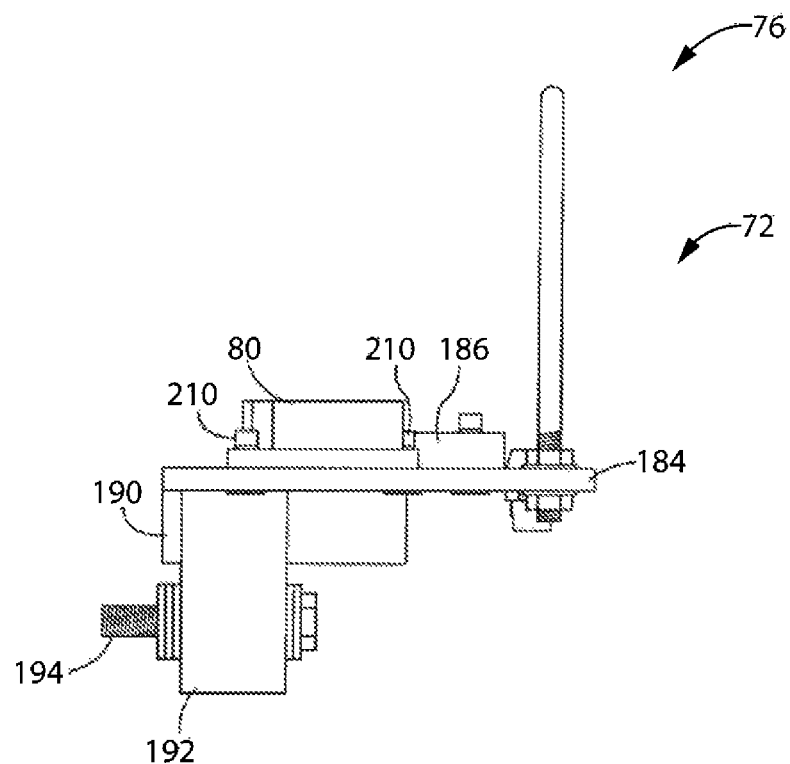
FIG. 10 is a front elevation view of the key portion shown in FIG. 1.
Figure 11:
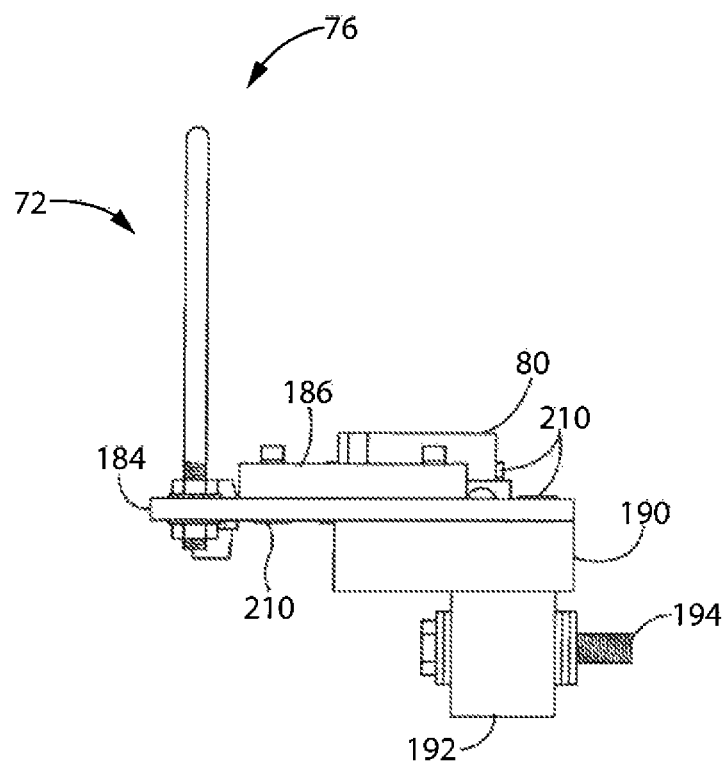
FIG. 11 is a rear elevation view of the key portion shown in FIG. 1.

FIGS. 5-7 show various sectional views of lock portion 70 of lockout system 50. As shown therein, housing 84 defines an interior cavity 150 associated with lock portion 70. A motor 152 is disposed in housing 84 and is connected to a drive system 154 disposed between motor 152 and lock arm bracket 124. Drive system 154 includes a drive coupling 156 that is connected to a shaft 158. Shaft 158 is configured to rotate upon operation of motor 152. A shuttle body 160, such as a nut, cooperates with shaft 158 and is translatable along a longitudinal axis, indicated by line 162, of shaft 158 during rotation of shaft 158. A stein 164 extends from shuttle body 160 and cooperates with bracket 124 such that translation of shuttle body 160 along longitudinal axis 162 of shaft 158 rotates bracket 124 relative to stem 164 and housing 84.

As alluded to above and shown in FIG. 7, lock portion 70 includes a control or controller 166, such as printed circuit board or the like, that is operationally connected to RFID card reader 68 and electrical interface 78. Controller 166 can include a power connector 168 associated with providing a severable electrical connection with interface 78 or be directed connected thereto to accommodate communication between key portion 72 and the controller 166 associated with lock portion 70 when key portion 72 is engaged therewith. As disclosed further below, lock portion 70 includes one or more proximity or position indicators 172, 178 associated with assessing a LOCK and UNLOCKED condition associated with the position of lock arm 86 of lock portion 70 relative to throw lever 62 associated with panel 52.

Referring to FIGS. 5 and 6, bracket 124 is connected to lock arm 86 such that rotation of bracket 124 rotates lock arm 86 about a longitudinal axis, indicated by line 170 (FIG. 7), associated with first portion 120 such that U-shaped portion 122 of lock arm 86 moves between a first or UNLOCKED position 174, as shown in FIG. 5, and a second or LOCKED position 176, as shown in FIG. 6, relative to housing 84 and bracket 118 of lock portion 70. As explained further below, when lock arm 86 is oriented in first position 174, lock arm 86 does not interfere with the motion of throw lever 62 associated with electrical panel 52. That is to say, throw lever 62 is UNLOCKED such that the User can manually connect and disconnect load 60 to power source 58 via manipulation of throw lever 62 between ON position 64 and OFF position 66 relative to panel 52. When oriented in the second or LOCKED position 176, lock arm 86 interferes with translation of throw lever 62 from OFF position 66 to ON position 64 such that load 60 cannot be electrically connected to power source 58 without first resolving the positional interference between lock arm 86 and the travel path associated with movement of throw lever 62 between OFT position 66 and ON position 64. That is to say, panel 52 is "locked-out" until lock arm 86 is returned to UNLOCKED position 174.

FIGS. 8-13 show various views of key portion 72 of lockout system 50. As shown therein, guide arrangement 76 of key portion 72 includes a first spear or rod 180 and a second spear or rod 182 that are supported by a body or base 184 and offset relative to one another. Rods 180, 182 are positioned relative to one another to slidably cooperate with a respective guide tube 100, 102 associated with lock portion 70 when manipulation of lock arm 86 is desired. In a preferred embodiment, base 184 is defined by a translucent and preferably transparent plate. An RFID card holder 186 is supported by base 184 and cooperates with an RFID card 188 that can be included or removably associated therewith. It is envisioned that the RFID card can be associated with discrete user's or classes of users configured to interact with lock portion 70 and/or be configured to provide a "LOCK"/"UNLOCK" instruction to lock portion 70 when key portion 72 is positionally and electronically associated therewith. It is further appreciated that one or both of lock portion 70 and key portion 72 can include a control or controller, such a printed circuit board or the like configured to accommodate the communication of one or more instructions between lock portion 70 and key portion 72 of lockout system 50. It is further envisioned that key holder 186, while an authorized RFID card 188 is inserted or otherwise associated therewith, provides a lock operation authorization, such as an authorized or correct key code to activate the lock and/or unlock sequences associated with cooperation of the lock portion 70 and key portion 72 to achieve the operation of system 50 as described further below.

Key portion 72 includes a power source 190 that is supported by base 184 and is electrically connected to electrical interface 80. Power source 190 is preferably a replaceable and/or rechargeable battery although it is appreciated that key portion 72 could be configured to cooperate with lock portion 70 so as to derive operational power from electrical panel 52 and/or a power source associated with lock portion 70.

A mount adapter 192 extends in a generally downward direction from base 184 and is constructed to removably cooperate with an extension handle, such as a hot stick or the like, to allow the user to remotely engage key portion 72 with lock portion 70 of lockout system 50. As those skilled in the art will appreciate, the term "hot stick" commonly refers to an extension handle that is formed of a non-conductive material such that a user can interact with electrical appliances or devices from locations that are commonly beyond an arm's reach proximity to one another. A connection interface, such as a faster 194, adjustably or removably cooperates with mount adapter 192 and is configured to accommodate connection of the hot stick to key portion 72 and such that the hot stick is electrically isolated from key portion 72. Key portion 72 can also include one or more indicators 196, 198, such as LED's or other audible, visual, or tactile indicators, associated with communicating status information to a user. LED indicators 196, 198 are electrically connected to electrical interface 80, power source 191, and/or the control associated with key portion 72 and configured to provide a visual indication to the remote user as to the LOCKED or UNLOCKED condition associated with utilization of electrical panel 52 and/or the orientation of lock arm 86 relative to throw lever 62.

Figure 13:
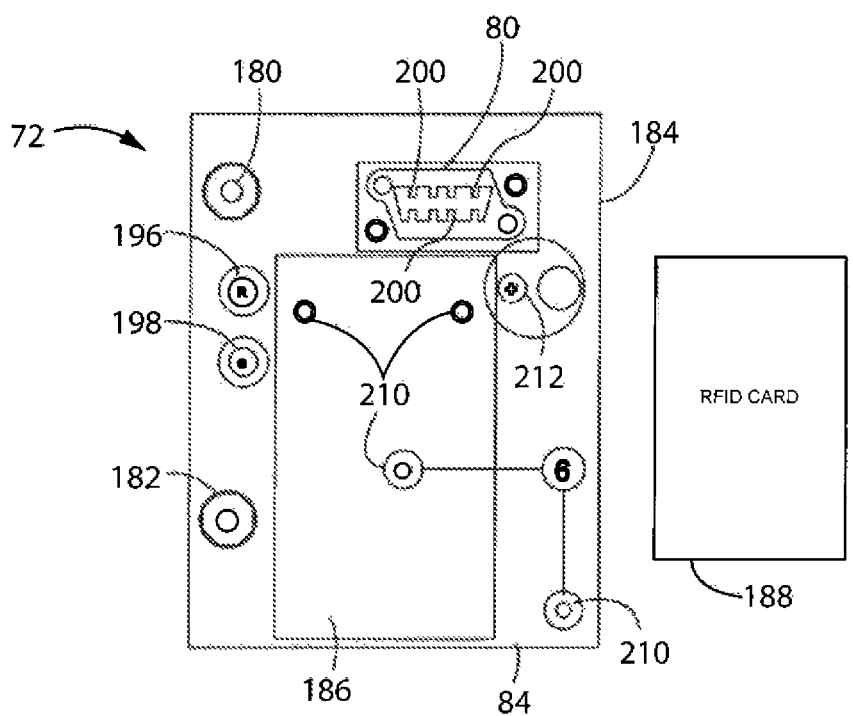
FIG. 13 is a bottom plan view of the key portion shown in FIG. 1.

Referring to FIGS. 2 and 13, it should be appreciated that the orientation of guide tubes 100, 102 and electrical interface 78 associated with lock portion 70 are generally mirror images relative to the position of guide rods 180, 182 and electrical interface 80 associated with key portion 72 such the slidable association of key portion 72 relative to lock portion 70, along direction 96 (FIG. 1), provides physical and electrical interaction between key portion 72 and lock portion 70. Electrical interface 78 of lock portion 70 and electrical interface 80 of key portion 72 are provided in a plug-and-play or male/female shape and configuration such that the electrical interfaces 78, 80 removably cooperate with one another when the lock and key portions 70, 72 are engaged with one another.

Figure 12:
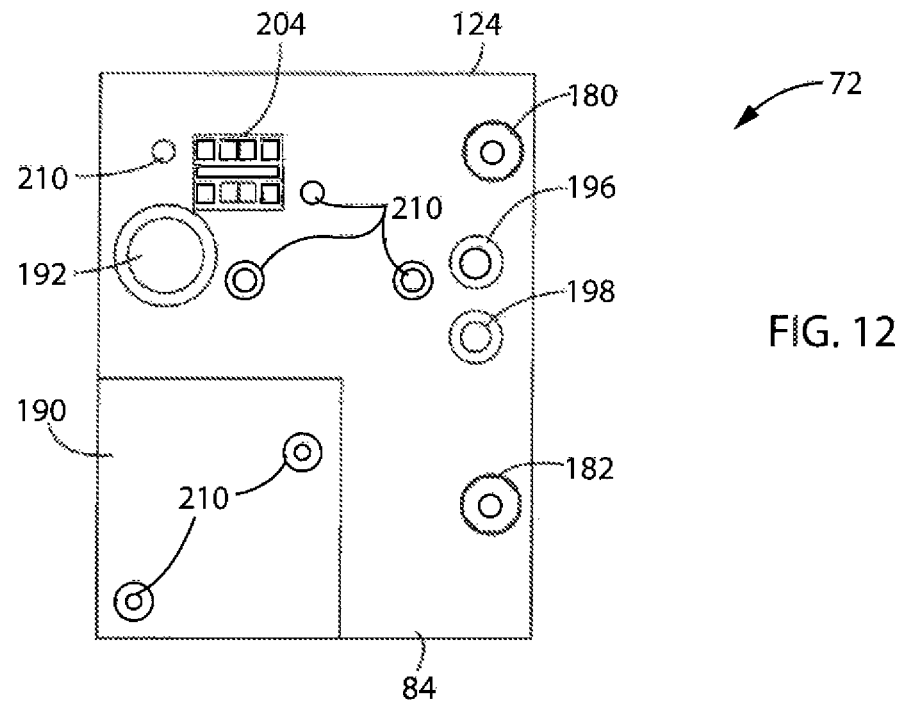
FIG. 12 is a top plan view of the key portion shown in FIG. 1.

Electrical interface 80 includes a number of pin connectors 200 that slidably cooperate with pin connectors 132 associated with electrical interface 78 of lock portion 70 to accommodate electrical communication between key portion 72, and lock portion 70 to generate the desired position of lock arm 86 relative to throw lever 62 associated with electrical panel 52 while an authorized RFID card 188 is inserted into the RFID card holder 186 and in communication with RFID card reader 68. Referring to FIGS. 12 and 13, electrical interface 80 preferably includes an electrical socket 204 configured to accommodate plug-and-play and/or removable electrical conductivity between power source 190, indicator 196, and indicator 198 electrical interface 80. It is appreciated that other connection methodologies are feasible.

Key portion 72 further includes one or more fasteners 210 associated with securing electrical interface 80, power source 190, RFID card holder 186, and other such structures to base 184 of key portion 72. More robust structures, such as rods 180, 182 associated with guide arrangement 76 and mount adapter 192 associated with removable cooperation with the hot stick can be independently secured to base 184 of key portion 72. For instance, as shown in FIG. 13, a fastener 212 passes through base 184 and cooperates with mount adapter 192 so as to secure mount adapter 192 relative to base 184 of key portion 72 whereas rods 180, 182 include a threaded end that cooperates with or is otherwise secured to base 184. Such configurations improve the durability associated with utilization of key portion 72.

Figure 14:
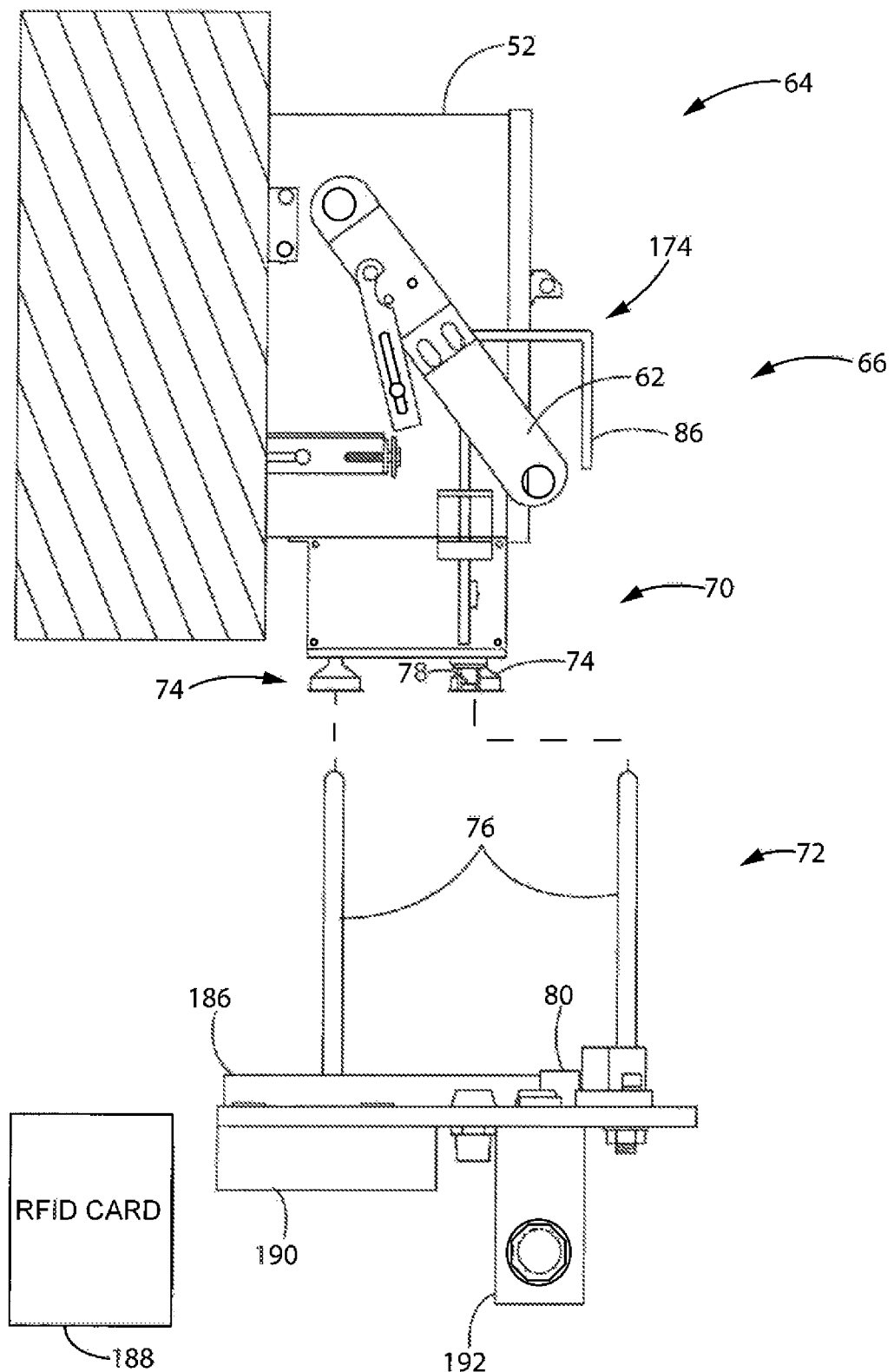
FIG. 14 is a side elevation view of the lockout system shown in FIG. 1 with a throw lever of an underlying electrical panel in an "OFF" position and with a lock arm of the lockout system in an unlocked position.
Figure 15:
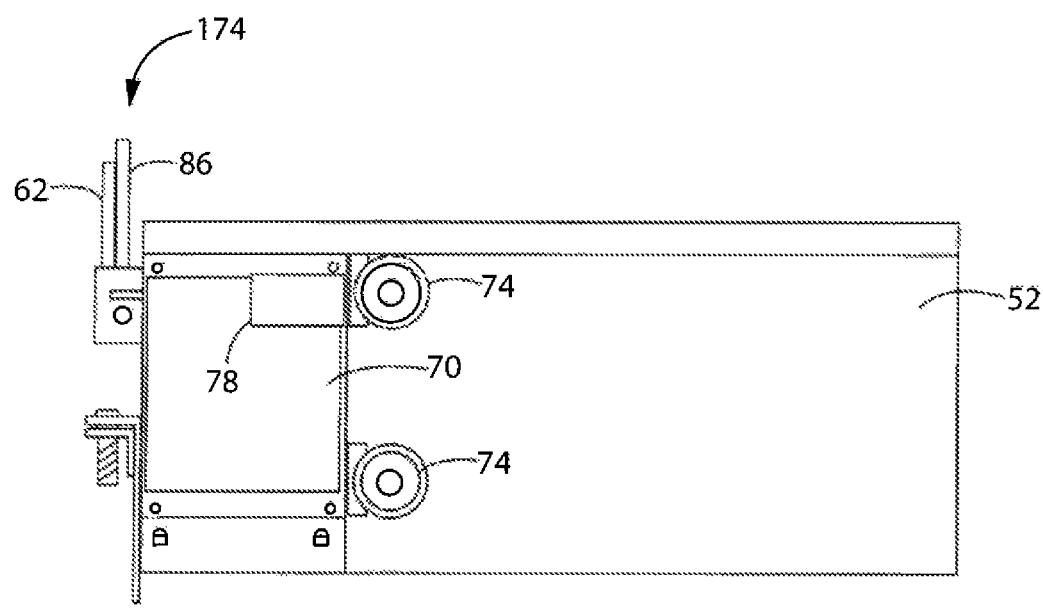
FIG. 15 is a bottom plan view of the lockout system shown in FIG. 14.
Figure 16:
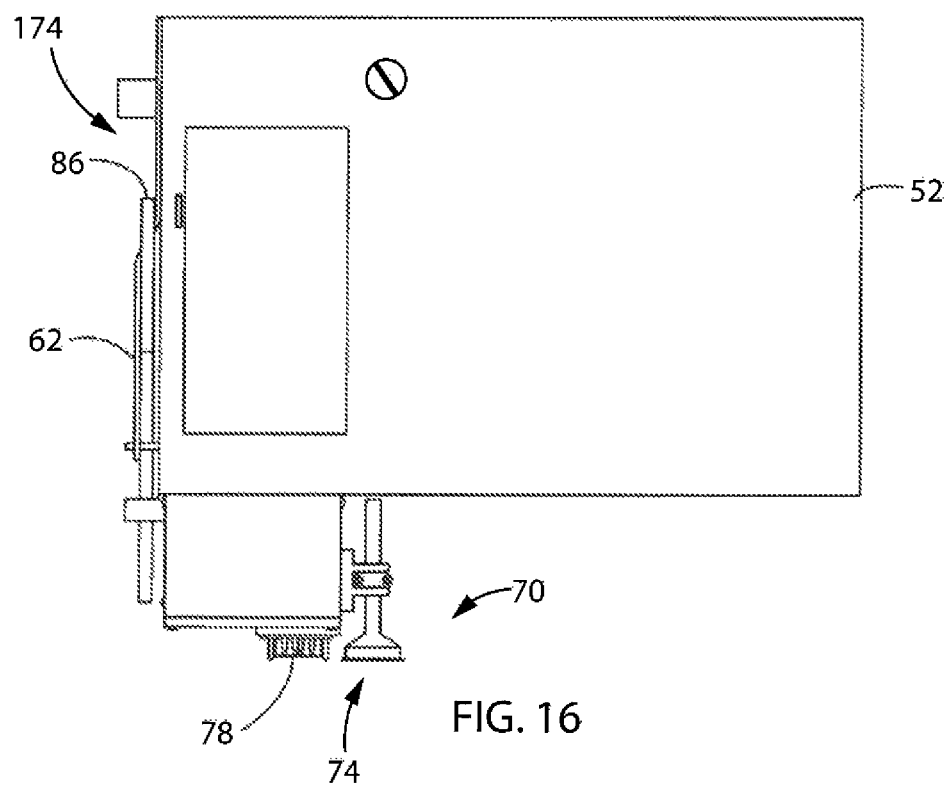
FIG. 16 is a front elevation view of the lockout system shown in FIG. 14.

FIGS. 14-16 show various views of electrical panel 52 having lock portion 70 associated therewith. As shown in FIG. 14, throw lever 62 is shown oriented in OFF position 66 associated with a non-conducting condition relative to the communication of an electrical signal through electrical panel 52 to load 60. Referring, to FIGS. 15 and 16, throw lever 62 and lock arm 86 are oriented relative to electrical panel 52 such that throw lever 62 can bypass lock arm 86 to allow manual movement of throw lever 62 between ON position 64 and OFF position 66 associated with usage of electrical panel 52. When a lockout condition is desired, throw lever 62 is translated to OFF position 66 and key portion 72 is subsequently introduced to lock portion 70 to effectuate a desired movement of lock arm 86 relative to throw lever 62. Guide arrangements 74, 76 of lock portion 70 and, key portion 72 slidably cooperate with one another so as to index or otherwise align electrical interface 80 of key portion 72 with electrical interface 78 of lock portion 70. The association of an authorized RFID card 188 while in RFID card holder 186 with card reader 68 associated with lock portion 70 and the introduction of key portion 72 with lock portion 70 allows key portion 72 to interact with lock portion 70 so as to manipulate the orientation of lock arm 86 relative to throw lever 62 of electrical panel 52 to achieve the desired LOCKED/UNLOCKED conditions associated with operation of throw lever 62.

Figure 17:
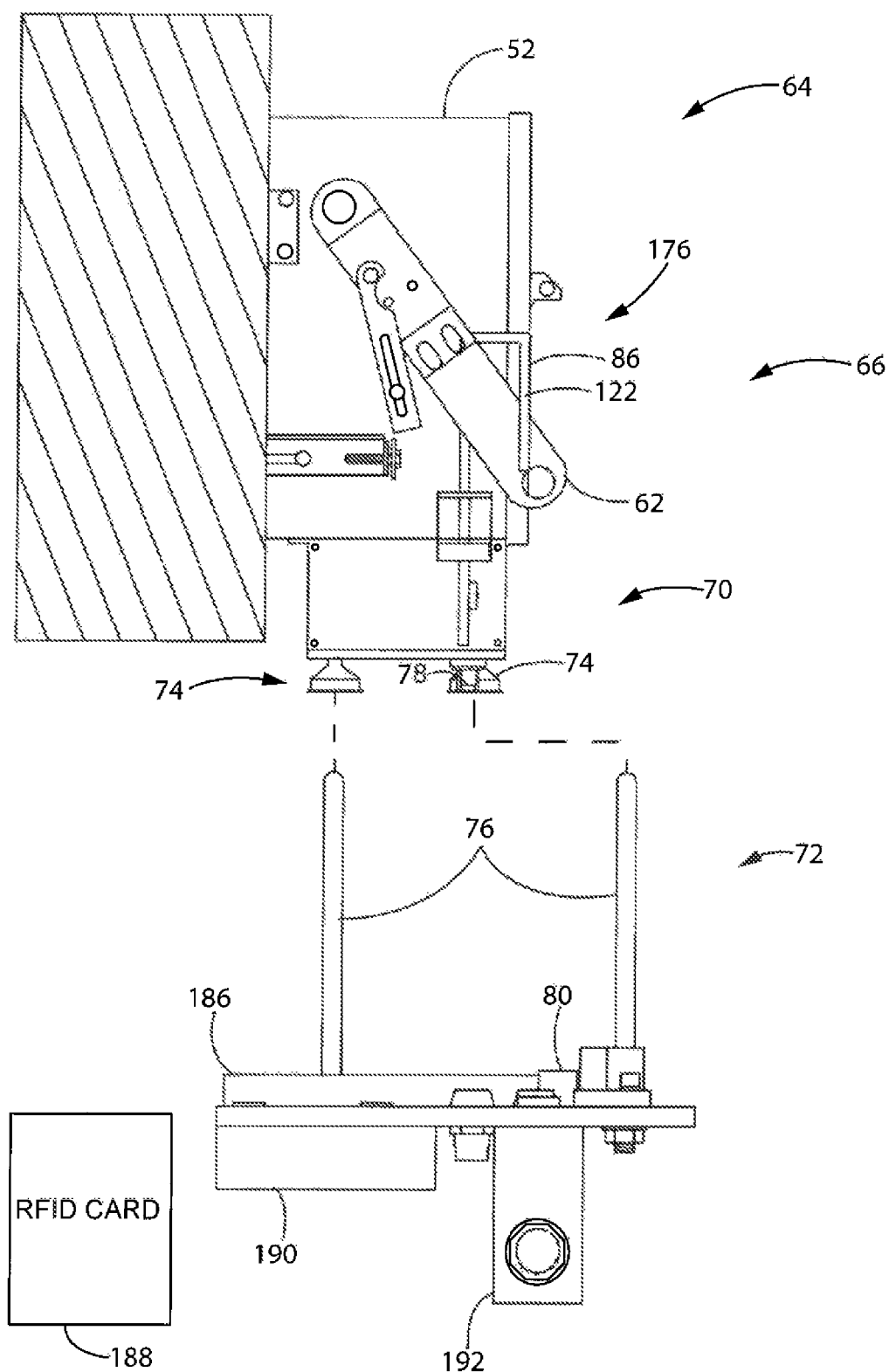
FIG. 17 is a view similar to FIG. 14 with the lock arm of the lockout system in a locked position relative to the throw lever of the electrical panel.
Figure 18:
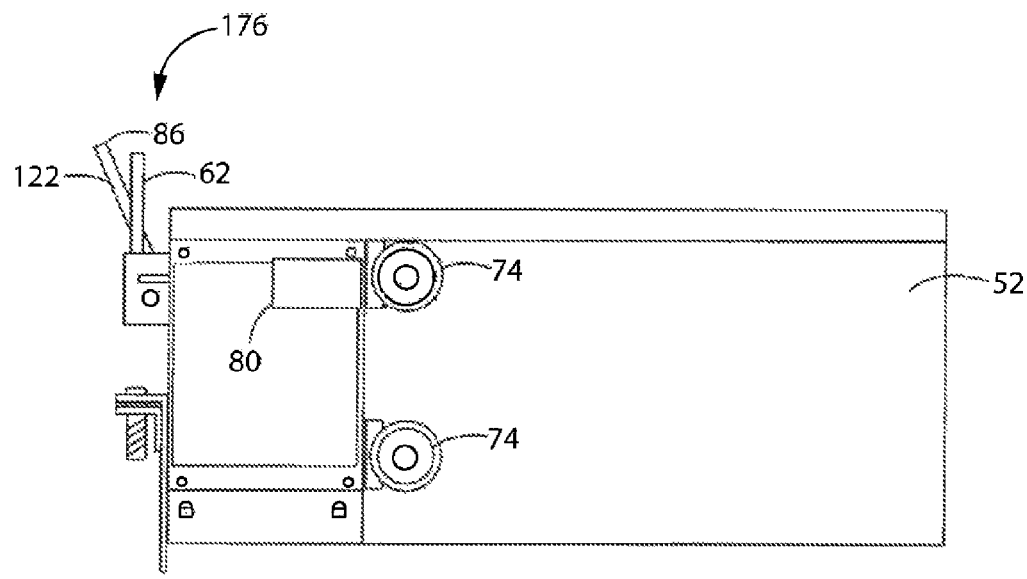
FIG. 18 is a view similar to FIG. 15 of the lockout system shown in FIG. 17.
Figure 19:
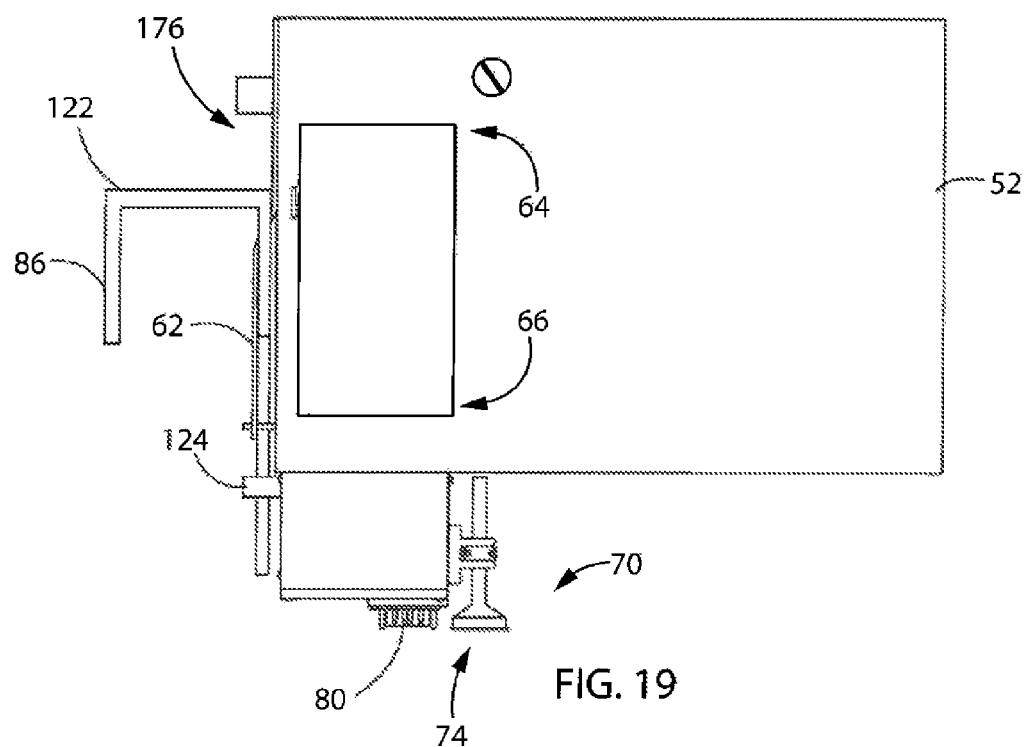
FIG. 19 is a view similar to FIG. 16 of the lockout system shown in FIG. 17.

Referring to FIGS. 17-19, during a locking sequence, key portion 72 is introduced a lock portion 70 so as to provide the electrical communication of authorized instructions associated with RFID card 188 while in card holder 186 to lock portion 70 to effectuate operation of motor 152 (FIG. 5) so as to translate lock arm 86 to LOCK position 176 such that lock arm 86 interferes with manipulation of throw lever 62 relative to electrical panel 52. As shown in FIGS. 18 and 19, when lock arm 86 is moved to LOCK position 176, U-shaped portion 122 of lock arm 86 extends across the travel path associated with throw lever 62 such that throw lever 62 cannot be moved from OFF position 66 to ON position. 64 associated with communicating an electrical signal to load 60 (FIG. 1). As explained further below with respect to FIGS. 20-21, removal and reintroduction of key portion 72 to lock portion 70 and/or alternate RFID cards 188 can be provided to effectuate the desired translation of lock arm 86 relative to throw lever 62 to effectuate the desired LOCKED position 176 or UNLOCKED position 174 of lock arm 86 relative to throw lever 62 to provide a LOCKOUT condition associated with electrical panel 52 when desired.

As disclosed further above, during normal use of load 60, throw lever 62 associated with electrical panel 52 is oriented in ON position 64 such that operational power can be communicated through electrical panel 52 from power source 58 to load 60 or one or more intermediary devices, such as ON/OFF, trip, or other switches or the like associated with operation of load 60. When a LOCKOUT condition is desired, the user manually moves throw lever 62 to OFF position 66 to electrically isolate load 60, or any intermediary switches or the like, from power source 58. Such operation isolates load 60 from the power source 58 but leaves throw lever 62 available for manual translation between OFF position 66 and ON position 64. That is, during an UNLOCKED condition associated with a lockout system 50, lock arm 86 is maintained in UNLOCKED position 174 (FIG. 5) independent of the position of throw lever 62 relative to panel 52.

Figure 20:
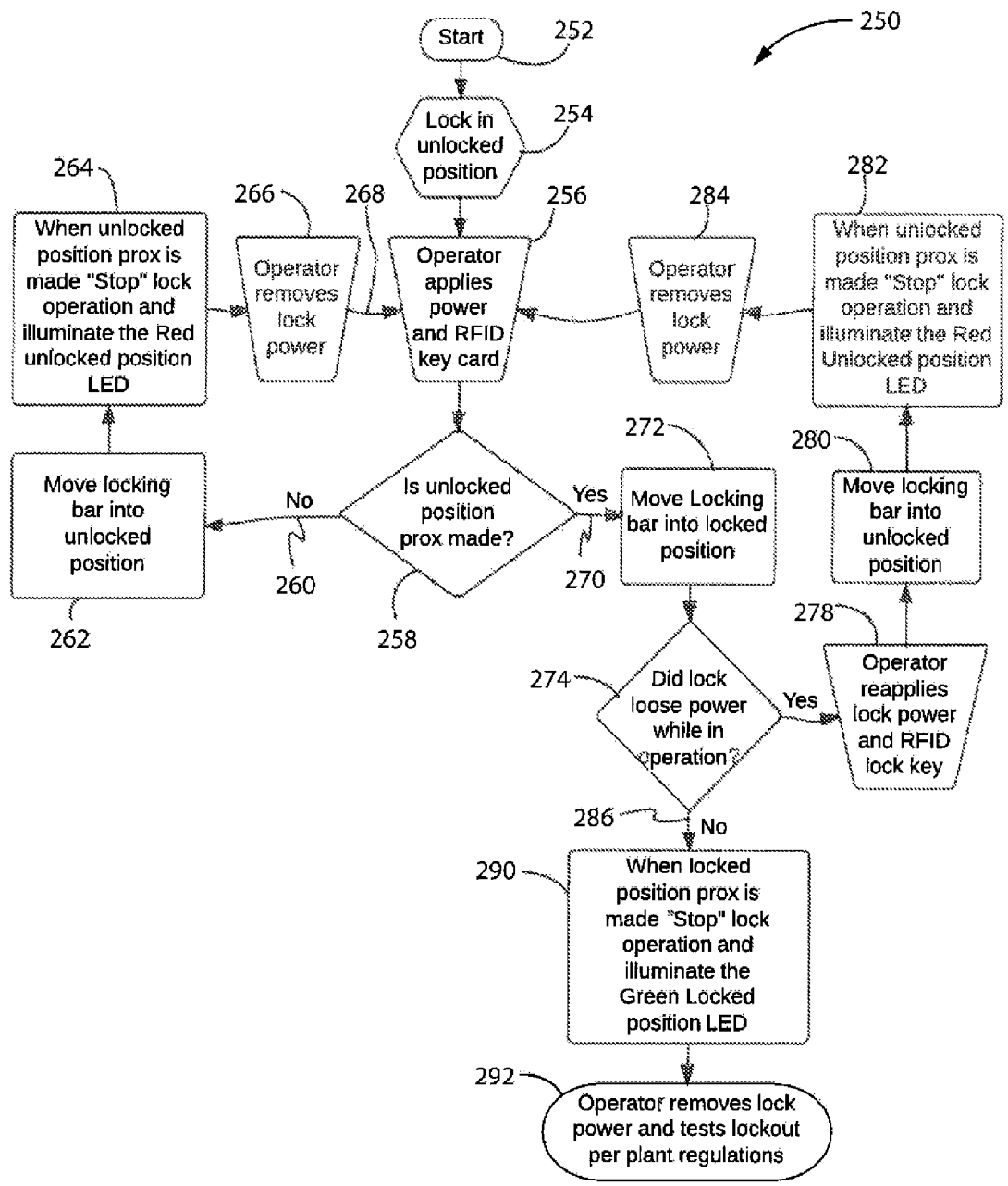
FIG. 20 is a graphical representation of an exemplary locking operation sequence of the lockout system shown in FIG. 1.
Figure 21:
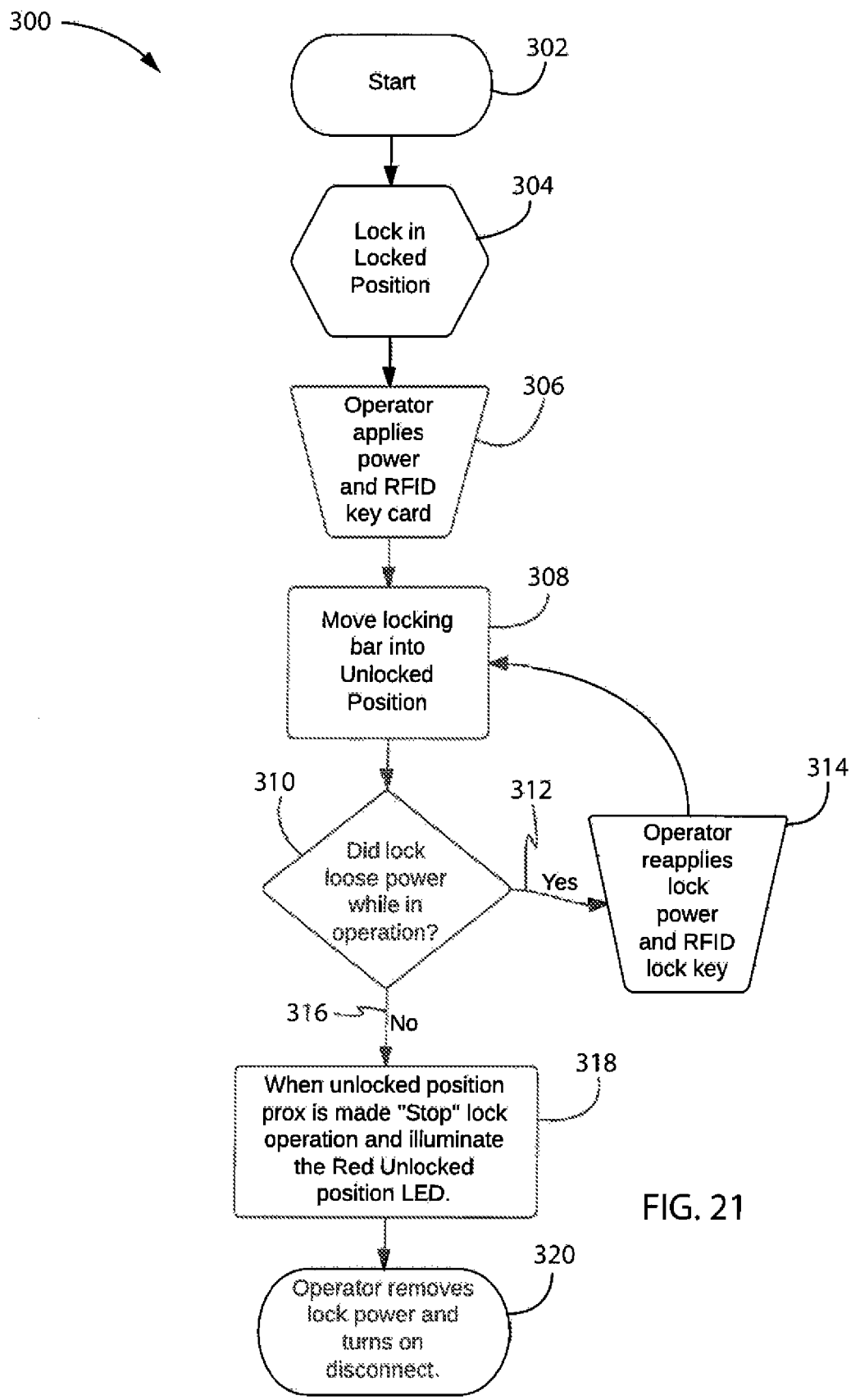
FIG. 21 is a graphical representation of an exemplary unlocking operation sequence of the lockout system shown in FIG. 1.

Referring to FIG. 20, when a LOCKOUT condition is desired, a lockout sequence 250 can be initiated 252 after throw lever 62 is manually moved from ON position 64 to OFF position 66 as indicated in FIG. 1 when lock arm 86 is in UNLOCKED position 254. Upon introduction 256 of key portion 72 with lock portion 70, sequence 250 checks that lock arm 86 is in unlocked position 174 via a proximity check 258 associated with proximity detector 178 (FIG. 7). If lock arm 86 is not in the unlocked position 260, sequence 250 initiates operation of motor 152 to move lock arm 86 to the unlocked position 262 and illuminates an indicator 196 that provides a visual indication that lock arm 86 is not positioned to interfere with translation of the throw lever associated with the electrical panel 264. The operator then removes the key portion from the lock portion 266 leaving lock arm 86 in the UNLOCKED position relative to throw lever 62.

Upon reintroduction 268 of the key portion with the lock portion and confirmation that the lock arm is in the unlocked position 270, sequence 250 effectuates operation of motor 152 so as to translate lock arm 86 into the locked position 272 associated with physical interference of manual translation of throw lever 62. Upon confirmation that the lock arm is in the lock position, such as via proximity detector 172 (FIG. 7), sequence 250 checks for a loss of power condition 274 associated with lock portion 70. If a power loss condition exists 276, the operator reintroduces key portion to the lock portion 278 such that lock arm 86 moves to the unlocked position 280 and the unlocked indicator is illuminated 282 such that the operator can again remove 284 key portion 72 from lock portion 70. When in the locked position, if no loss of power occurred 286, sequence 250 verifies that lock arm 86 achieved the locked position and illuminates an indicator indicative of the locked position 290 associated with the position of lock arm 86 relative to throw lever 62. Removal of key portion 72 from lock portion 70 leaves lockout system 50 in the locked orientation such that the operator can test operation of lockout system 50 in accordance with established regulations 292. Lock portion 70 of lockout system 50 remains in the LOCKED configuration until a subsequent instruction is received from a user.

When it is desired to achieve an UNLOCKED condition of lockout system 50, lockout system 50 effectuates an unlocked sequence 300 associated with configuring electrical panel 52 for communication of power between power source 58 and load 60. Initiation 302 of unlock sequence 300 begins with lock arm 86 in the locked position 304. The operator applies power and an authorized RFID card 306 to lock portion 70 via introduction of a suitably configured key portion 72 with lock portion 70. From the LOCKED position, sequence 300 moves lock arm 86 to the UNLOCKED position and performs a check 310 to verify power continuity associated with operation of lock portion 70. If power was interrupted during operation 312, reintroduction 314 of the key portion with the lock portion re-initiates movement of the lock arm to the UNLOCKED position 308. If power was continuously available 316 so as to complete the UNLOCKED operation, sequence 300 verifies that lock arm 86 achieved an UNLOCKED position relative to throw lever 62 and illuminates an indicator 196, 318 associated with indicating that lock arm 86 is in a position wherein the lock arm does not interfere with manual translation of throw lever 62 relative to electrical panel 52 such that the operator can reestablish electrical conductivity between power source 58 and load 60. Subsequent user interaction, operation, or manipulation of throw lever 62 allows the user to turn ON the disconnect 320, i.e. move throw lever 62 from OFF position 66 to ON position 64, such that subsequent operation of load 60 is possible via communication of an electrical signal from power source 58 to load 60 via electrical panel 52.

Lockout system 50 provides an electrical panel lockout system that can be interacted with from locations more remote than within an arm's reach of the panel with which the lockout system is associated. The physical and electrical interfaces between the key portion and the lock portion, as well as the communications between the RFID card and the RFID card reader, provides for an electrical panel lockout system that is less susceptible to unauthorized manipulation thereby providing a secure electrical panel lockout system. It is further appreciated that the LOCK and UNLOCK operation sequence disclosed above is exemplary of one such sequence associated with achieving the desired LOCKED/UNLOCKED conditions associated with utilization of system 50 and that other operational sequences are envisioned and within the scope of the present invention.

Therefore, one embodiment of the invention includes an electrical panel lockout system having an alignment arrangement and an RFD interface supported by a housing securable to art electrical panel. The alignment arrangement is configured to align a RFID key with the RFID interface. A lock arm is supported by the housing and is movable between a first position and a second position. When in the first position, the lock arm does not interfere with motion of a throw lever associated with a conducting condition of an electrical panel. When in the second position, the lock arm interferes with motion of the throw lever thereby preventing changes to the conducting state associated with the position of the throw lever. The lock arm is movable between the first position and the second position in response to association of a RFID key with the RFID interface.

Another embodiment of the invention that is useable with the above embodiment includes an electrical panel system having an electrical panel configured to communicate power to a load. A lever is located outside the electrical panel and moveable between a first position associated with electrically isolating a load from a power source and a second position associated with electrically connecting the load to the power source. The system includes a lockout system having a first portion that is connected to the electrical panel and a second portion that removably cooperates with the first portion. The first portion of the lockout system includes a lock arm that is associated with the lever and is moveable between a first position wherein the lock arm interferes with motion of the lever and a second position wherein the lever is movable relative to the lock arm. The first portion of the lockout system includes a guide arrangement and an electrical lock interface. The second portion of the lockout system includes an electrical key interface and an alignment arrangement. The alignment arrangement is constructed to slidably cooperate with the guide arrangement such that cooperation of the alignment arrangement with the guide arrangement aligns the electrical key interface with the electrical lock interface to allow slidable physical interaction between the electrical lock interface and the electrical key interface to accommodate selective remote manipulation of the lock arm relative to the lever of the electrical panel.

Another embodiment of the invention that is combinable with one or more of the above embodiments is a method of forming a remotely operable electrical lockout. The method includes mounting a lock portion of a lockout system to an electrical panel such that a movable lockout arm is positioned proximate a lever whose position relative to the panel is associated with a conducting state of a circuit associated with the electrical panel. The lock portion of the lockout system is provided with a first portion of an indexing arrangement and a first portion of an electronic interface. A removable key portion of the lockout system can be selectively associated with the lock portion and includes a second portion of the indexing arrangement and a second portion of the electronic interface such that the first and second portions of the indexing arrangement cooperate with one another prior to interaction between the first and second portions of the electronic interface to align the first and second electronic interfaces with one another such that the first and second portions of the electronic interface slidably cooperate with one another prior to dissociation of first and second portions of the indexing arrangement.

It is appreciated that the lockout system disclosed herein may include various additions, modifications, and rearrangements that are within capabilities of those skilled in the art from the disclosure of the present application. It is intended that the appended claims cover all such additions, modifications, and rearrangements. Expedient embodiments of the present invention are differentiated by the appended claims which also form part of the specification.

What is claimed is:

1. An electrical panel lockout system comprising:
   a housing;
   an alignment arrangement and an RFID interface supported by the housing, the alignment arrangement being configured to align a RFID key with the RFID interface in a longitudinal direction and prevent rotation of the RFID key relative to the housing and the RFID interface; and
   a lock arm supported by the housing and movable between a first position and a second position wherein the lock arm does not interfere with motion of a throw lever associated with a conducting condition of an electrical, panel when in the first position and the lock arm interferes with motion of the throw lever when in the second position, the lock arm being movable between the first position and the second position in response to association of a RFID key with the RFID interface and without rotation between the RFID key and the housing and the RFID interface.

2. The electrical panel lockout system of claim 1 further comprising another alignment arrangement that is associated with the RFID key and configured to slidably cooperate with the alignment arrangement supported by the housing.

3. The electrical panel lockout system of claim 2 wherein the alignment arrangement includes at least one of a pair of sleeves and a pair of spears and the another alignment arrangement includes the other of the pair of sleeves and the pair of spears.

4. The electrical panel lockout system of claim 1 wherein the lock arm is rotational relative to the housing.

5. The electrical panel lockout system of claim 1 further comprising a motor electrically connected to one of the electrical panel and a power source associated with the RFID key such that the motor is operable to move the lock arm between the first and second positions.

6. The electrical panel lockout system of claim 5 further comprising a screw connected to the motor and a nut coupled to the screw and connected to the lock arm.

7. The electrical panel lockout system of claim 1 wherein the lock an is rotationally connected to the housing and rotates during movement between the first and second positions.

8. A method of forming a remotely operable electrical lockout, the method comprising:
   mounting a lock portion of a lockout system to an electrical panel to position a movable lockout arm proximate a lever whose position relative to the panel is associated with a conducting state of a circuit associated with the electrical panel;
   providing the lock portion of the lockout system with a first portion of an indexing arrangement and a first portion of an electronic interface; and
   associating a removable key portion of the lockout system that includes a second portion of the indexing arrangement and a second portion of the electronic interface with the lock portion, to allow the first and second portions of the indexing arrangement to slideably cooperate with one another prior to interaction between the first and second portions of the electronic interface to align the first and second electronic interfaces with one another and prevent rotation of removable key portion relative to the lock portion, the first and second portions of the electronic interface slidably cooperating with one another prior to dissociation of the first and second portions of the indexing arrangement and to render the removable key portion of the lockout system non-rotatable relative to the lock portion when the first and second portions of the indexing arrangement are engaged with one another and during operation of the movable lockout arm.

9. The method of claim 8 further comprising providing a radio frequency identification between the lock portion and the removable key portion.

10. The method of claim 8 further comprising providing an indication of a position of a lockout arm relative to the lever.

11. The method of claim 8 further comprising providing a motor associated with the lock portion for effectuating movement of the lockout arm.

12. The method of claim 11 further comprising rotating a screw during operation of the motor.

13. The method of claim 12 further comprising transferring a shuttle along the screw to move the lockout arm relative to the lever.

* * * * *

UNITED STATES PATENT AND TRADEMARK OFFICE
CERTIFICATE OF CORRECTION

| | | |
|---|---|---|
| PATENT NO. | : 9,520,007 B2 | Page 1 of 1 |
| APPLICATION NO. | : 14/269988 | |
| DATED | : December 13, 2016 | |
| INVENTOR(S) | : James C. Stippich | |

It is certified that error appears in the above-identified patent and that said Letters Patent is hereby corrected as shown below:

In the Claims

In Claim 1, Column 12, Line 22, Delete "," after "electrical".

In Claim 7, Column 12, Line 49, Replace "an" with "arm".

Signed and Sealed this
Fourth Day of July, 2017

Joseph Matal
*Performing the Functions and Duties of the
Under Secretary of Commerce for Intellectual Property and
Director of the United States Patent and Trademark Office*